(12) United States Patent
Schuba et al.

(10) Patent No.: US 8,195,980 B2
(45) Date of Patent: Jun. 5, 2012

(54) VIRTUAL MACHINE SNAPSHOTTING AND DAMAGE CONTAINMENT

(75) Inventors: Christoph L. Schuba, Mountain View, CA (US); Tim P. Marsland, Half Moon Bay, CA (US)

(73) Assignee: Oracle America, Inc., Redwood Shores, CA (US)

( * ) Notice: Subject to any disclaimer, the term of this patent is extended or adjusted under 35 U.S.C. 154(b) by 219 days.

(21) Appl. No.: 12/415,572

(22) Filed: Mar. 31, 2009

(65) Prior Publication Data

US 2010/0251004 A1   Sep. 30, 2010

(51) Int. Cl.
*G06F 11/00* (2006.01)

(52) U.S. Cl. .............................. 714/15; 714/37; 714/38.1

(58) Field of Classification Search ....................... 714/15
See application file for complete search history.

(56) References Cited

U.S. PATENT DOCUMENTS

| | | | |
|---|---|---|---|
| 5,581,749 A * | 12/1996 | Hossain et al. .......................... 1/1 |
| 6,691,250 B1 * | 2/2004 | Chandiramani et al. ......... 714/25 |
| 6,745,344 B1 * | 6/2004 | Joshi et al. ...................... 714/38 |
| 2005/0055177 A1 * | 3/2005 | Malik et al. .................... 702/183 |
| 2006/0282471 A1 * | 12/2006 | Mark et al. ..................... 707/200 |
| 2008/0195369 A1 * | 8/2008 | Duyanovich et al. ........... 703/22 |
| 2010/0049857 A1 * | 2/2010 | Libert ............................ 709/228 |
| 2010/0058106 A1 * | 3/2010 | Srinivasan et al. ................ 714/2 |
| 2010/0070678 A1 * | 3/2010 | Zhang et al. ...................... 711/6 |
| 2010/0077165 A1 * | 3/2010 | Lu et al. ........................ 711/162 |
| 2010/0088543 A1 * | 4/2010 | Kambara et al. ................ 714/15 |
| 2010/0107158 A1 * | 4/2010 | Chen et al. ........................ 718/1 |
| 2010/0115341 A1 * | 5/2010 | Baker et al. ..................... 714/37 |
| 2010/0250824 A1 * | 9/2010 | Belay ................................ 711/6 |

* cited by examiner

*Primary Examiner* — Scott Baderman
*Assistant Examiner* — Kamini Patel
(74) *Attorney, Agent, or Firm* — Park, Vaughan, Fleming & Dowler LLP; Chia-Hsin Suen

(57) ABSTRACT

Some embodiments provide a system that manages the execution of a virtual machine. During operation, the system takes a series of snapshots of the virtual machine during execution of the virtual machine. If an abnormal operation of the virtual machine is detected, the system spawns a set of snapshot instances from one of the series of snapshots, wherein each of the snapshot instances is executed with one of a set of limitations. Next, the system determines a source of the abnormal operation using a snapshot instance from the snapshot instances that does not exhibit the abnormal operation. Finally, the system updates a state of the virtual machine using the snapshot instance.

20 Claims, 3 Drawing Sheets

VIRTUAL MACHINE SNAPSHOTTING AND DAMAGE CONTAINMENT

RELATED APPLICATION

The subject matter of this application is related to the subject matter in a co-pending non-provisional application by the same inventors as the instant application and filed on the same day as the instant application, entitled "Facilitated Virtual Machine Introspection," having Ser. No. 12/415,801 and filing date 31 Mar. 2009.

BACKGROUND

1. Field of the Invention

The present embodiments relate to techniques for managing the execution of virtual machines. More specifically, the present embodiments related to a method and system for managing the execution of virtual machines using snapshotting and damage containment techniques.

2. Related Art

Virtualization may be used to run multiple operating system instances on a single physical machine. For example, virtualization may allow multiple types of operating systems to run within virtual machines on a single server and share the physical resources of the server. As a result, virtualization in computing systems provides a number of advantages, such as improved utilization of resources, reduction of costs, server consolidation, and/or bypassing of interoperability restraints.

However, virtualized environments may be subject to the same security and integrity risks as those of native environments. In particular, each virtual machine within a physical machine may be vulnerable to intrusion and attack from a variety of sources. Moreover, the execution of multiple types of operating systems on a single computing system may complicate the implementation of security measures for the computing system by requiring that the security measures address security vulnerabilities for each type of operating system on the computing system. As a result, attacks on virtual machines within a single physical machine may be difficult to detect, analyze, and/or manage.

Hence, what is needed is a mechanism for facilitating the detection, analysis, and management of attacks and exploits on virtual machines.

SUMMARY

Some embodiments provide a system that manages the execution of a virtual machine. During operation, the system takes a series of snapshots of the virtual machine during execution of the virtual machine. If an abnormal operation of the virtual machine is detected, the system spawns a set of snapshot instances from one of the series of snapshots, wherein each of the snapshot instances is executed with one of a set of limitations. Next, the system determines a source of the abnormal operation using a snapshot instance from the snapshot instances that does not exhibit the abnormal operation. Finally, the system updates a state of the virtual machine using the snapshot instance.

In some embodiments, updating the state of the virtual machine using the snapshot instance involves accelerating the execution of the snapshot instance to reach a current state of the virtual machine and replacing the virtual machine with the snapshot instance.

In some embodiments, accelerating the execution of the snapshot instance involves caching incoming events associated with the virtual machine and executing the snapshot instance at an accelerated rate using the cached incoming events.

In some embodiments, the system also selects a snapshot from the series of snapshots to execute as the set of snapshot instances. If the source of the abnormal operation cannot be determined from the snapshot, the system selects an earlier snapshot from the series of snapshots to execute as the set of snapshot instances.

In some embodiments, the snapshots are taken at periodic intervals during execution of the virtual machine.

In some embodiments, each of the limitations is used to block a potential source of the abnormal operation.

In some embodiments, the potential source of the abnormal operation corresponds to at least one of a port and an address.

BRIEF DESCRIPTION OF THE FIGURES

In the figures, like reference numerals refer to the same figure elements.

DETAILED DESCRIPTION

Figure 1:
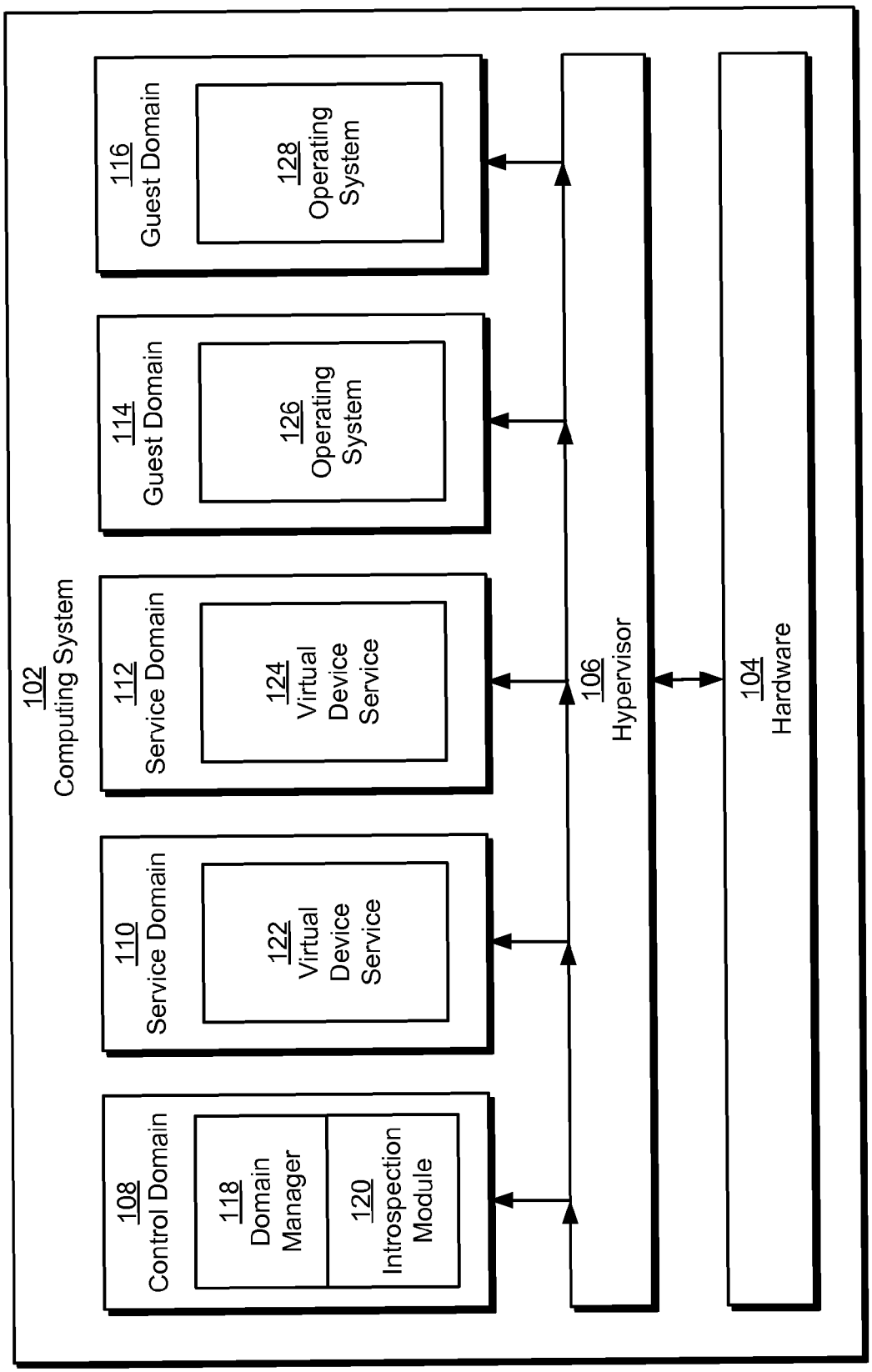
FIG. 1 shows a computing system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for executing a virtual machine. The virtual machine may run on a physical computing system along with a number of other virtual machines. In addition, the virtual machine may execute an operating system or application that obtains use of physical resources on the computing system through a hypervisor on the computing system.

More specifically, embodiments provide a method and system for managing the execution of the virtual machine. To facilitate management of the virtual machine's execution, a series of snapshots of the virtual machine may be taken during the virtual machine's execution. In addition, the virtual machine's execution may be monitored for abnormal operation. If abnormal operation is detected, a set of snapshot instances may be spawned from one of the snapshots. Each snapshot instance may execute with one of a set of limitations that may allow a source of the abnormal operation to be identified. In particular, each limitation may block a potential source of the abnormal operation. As a result, the snapshot instance that does not exhibit the abnormal behavior may include a limitation that blocks the source of the abnormal behavior. Furthermore, the snapshot instance may be used to manage and/or respond to the abnormal operation by replacing the virtual machine.

FIG. 1 shows a computing system 102 in accordance with an embodiment. Computing system 102 includes hardware 104, a hypervisor 106, a control domain 108, a set of service domains 110-112, and a set of guest domains 114-116. Each of these components is described in further detail below.

Computing system 102 may correspond to an electronic computing device that provides one or more services or functions to a user. For example, computing system 102 may operate as a personal computer, laptop computer, server, and/or workstation. Furthermore, the functionality of computing system 102 may be provided by the execution of software on hardware 104 components of computing system 102, such as processors, memory, input/output (I/O) devices, and/or network interface cards. For example, computing system 102 may include an operating system that coordinates the use of hardware 104 and software resources on computing system 102, as well as one or more applications that perform specialized tasks for the user.

More specifically, software such as operating systems and applications on computing system 102 may be executed within one or more virtual machines. Each virtual machine may correspond to a software-based virtualized environment for a physical machine (e.g., computing system 102) that executes on hardware 104. Each virtual machine may also be configured to execute a variety of applications, processes, and/or operating systems in isolation from other virtual machines on computing system 102. In other words, the independent execution of multiple virtual machines on a single set of hardware 104 resources may provide increased versatility, utilization of resources, and/or security to computing system 102.

In one or more embodiments, computing system 102 functions as a server, such as an application server, web server, and/or email server. As a result, computing system 102 may be configured to process incoming events from multiple users and/or provide a large variety of services to the users. To increase server-based functionality and performance, computing system 102 may execute a variety of operating system instances within the virtual machines. For example, computing system 102 may include three virtual machines respectively running Linux, Solaris (Solaris™ is a registered trademark of Sun Microsystems, Inc.), and Microsoft Windows (Microsoft Windows™ is a registered trademark of Microsoft Corp.). Applications and/or processes that are specific to an operating system may thus run on computing system 102 within the virtual machine containing the operating system. Furthermore, security exploits of one operating system may be confined to the virtual machine containing the operating system and may not affect the execution of other operating systems on other virtual machines in computing system 102.

In one or more embodiments, virtual machines on computing system 102 are executed as guest domains (e.g., guest domains 114-116). Computing system 102 may also include other domains, such as control domain 108 and service domains 110-112. Each domain may correspond to a logical grouping of software, resources, and/or identity within computing system 102 that is distinct from that of other domains. For example, each domain may include an operating system kernel, patches for the kernel, and tuning parameters for the kernel; a set of user accounts and/or administrators; a set of disks; and/or a set of network interfaces and addresses. In addition, the control and execution of domains on computing system 102 may be enabled by hypervisor 106.

Hypervisor 106 may correspond to a firmware layer on computing system 102 that operates as a hardware control for the domains. In other words, hypervisor 106 may manage the execution of the domains by controlling access to hardware 104 resources from each domain and maintaining isolation between the domains. For example, hypervisor 106 may allocate subsets of processor, memory, and/or I/O resources on computing system 102 to a given domain. Consequently, hypervisor 106 may support the simultaneous execution of multiple operating systems, each within a guest domain, on computing system 102. Alternatively, hypervisor 106 may correspond to a hosted hypervisor that runs within a native operating system on computing system 102 and obtains resources for the domains through the native operating system.

In one or more embodiments, the management of domains in computing system 102 is performed through control domain 108. More specifically, a domain manager 118 executing within control domain 108 may include functionality obtained through hypervisor 106 to create and manage domains as well as allocate resources to domains. In other words, domain manager 118 may correspond to a software component within control domain 108 that exposes the capabilities of hypervisor 106 to a user of control domain 108. Commands from the user for managing the domains may be sent through domain manager 118 to hypervisor 106, which may implement the commands by interfacing with hardware 104. For example, changes in resource allocation among domains may be obtained from a user by domain manager 118 and sent to hypervisor 106 for updating hardware 104 resource partitions associated with the domains.

Service domains 110-112 may provide virtual device services 122-124 to other domains of computing system 102. For example, service domains 110-112 may provide virtualized devices, such as virtual switches, disk servers, and/or network interface cards, to the other domains. The other domains may further interact with the virtualized devices in the same fashion as the other domains would interact with physical devices.

Those skilled in the art will appreciate that operating systems 126-128 may include security vulnerabilities. While an exploit of a security vulnerability may affect only the operating system containing the security vulnerability, such exploits may disable or adversely affect features or services that are provided by the affected operating systems. Furthermore, the exploits may be difficult to detect or analyze because of the semantic gap between virtualized environments (e.g., guest domains 114-116) within which the operating systems execute and monitoring mechanisms outside the virtualized environments.

To address security concerns related to virtual machines, the execution of virtual machines on computing system 102 may be managed using snapshotting and damage containment techniques that may allow exploits of the virtual machines to be detected, isolated, and managed. In particular, each virtual machine may be monitored during execution for abnormal operation by an introspection module (e.g., introspection module 120) in control domain 108 or another domain.

Each introspection module may correspond to a software component that performs integrity checks on the virtual machine based on the expected underlying operation of the virtual machine. Furthermore, each introspection module may bridge the semantic gap with the virtual machine because the operation of the introspection module is based on the code for the virtual machine. Introspection modules are described in further detail in the related co-pending non-provisional application by the same inventors as the instant application and filed on the same day as the instant application entitled, "Facilitated Virtual Machine Introspection," having Ser. No. 12/415,801, and filing date 31 Mar. 2009, which is incorporated herein by reference.

In addition, a series of snapshots of the virtual machine may be taken by domain manager 118 during the execution of the virtual machine. The snapshots may be taken periodically, such as in five-minute intervals. Incoming events to the virtual machine may also be cached by domain manager 118 and/or another component on computing system 102 for subsequent use in the analysis, detection, and/or management of potential exploits in the virtual machine. Incoming events may include, for example, network traffic, hardware events, input/output (I/O) events, and/or other events associated with the virtual machine. Each incoming event may further include a timestamp and/or other timing information. For example, an incoming event may include a start timestamp, a stop timestamp, and/or a duration. The timing information may be included in data associated with the incoming event (e.g., Transmission Control Protocol (TCP) timestamps in network packets), or the timing information may be determined by domain manager 118, hypervisor 106, and/or another component on computing system 102. For example, hypervisor 106 may note the time at which a hardware interrupt occurs and send the hardware interrupt and the time of occurrence to the component responsible for caching incoming events on computing system 102.

The virtual machine may continue executing until abnormal operation of the virtual machine is detected by introspection module 120. The abnormal operation may correspond to a deviation from the expected operation of the virtual machine as assessed by introspection module 120. Furthermore, the abnormal operation may indicate the presence of an exploit that caused a change in the operation of the virtual machine.

To enable analysis of the abnormal operation, domain manager 118 may spawn a set of snapshot instances from a snapshot taken from the virtual machine. Each snapshot instance may then be executed with a different limitation that blocks a potential source of the abnormal operation. In particular, each limitation may correspond to a port, address, disk input, keyboard input, and/or a remote shell that may serve as a potential source of the abnormal operation on the virtual machine. In addition, each snapshot instance may be executed at an accelerated rate using cached incoming events that have occurred since the snapshot was taken. The accelerated execution of each snapshot instance may continue to be monitored by introspection module 120 for the abnormal operation.

As the snapshot instances concurrently process the incoming events, the source of the abnormal operation may be revealed to introspection module 120 as the blocked port or address on the snapshot instance that does not exhibit the abnormal operation. Because the source of the abnormal operation is blocked in the snapshot instance, the snapshot instance does not process incoming events from the source of the abnormal operation and may remain unaffected by the exploit causing the abnormal operation. On the other hand, other snapshot instances may begin exhibiting the abnormal operation after processing an incoming event that executes the exploit.

However, if every snapshot instance exhibits the abnormal operation, the snapshot may already contain the exploit, and introspection of snapshot instances spawned from the snapshot may be ineffective at determining the source of the abnormal operation. Instead, domain manager 118 may spawn a new set of snapshot instances from an earlier snapshot of the virtual machine, and introspection module 120 may attempt to find the source of the abnormal operation from the new set of snapshot instances. Selecting increasingly older snapshots and spawning snapshot instances from the older snapshots may continue until the source of the abnormal operation can be determined from a snapshot that does not contain the exploit.

Alternatively, domain manager 118 may utilize a divide and conquer approach to executing snapshot instances. In particular, domain manager 118 may spawn each snapshot instance with multiple limitations rather than with a single limitation. The snapshot instance that does not exhibit the abnormal operation is then used to spawn another set of snapshot instances, into which the snapshot instance's limitations are divided. Continual spawning of snapshot instances with increasing specificity in limitations may thus continue until the specific source of the abnormal operation is found in a snapshot instance. Furthermore, while sequential execution of multiple sets of snapshot instances with increasingly specific limitations may require more time than executing a much larger set of snapshot instances that each contain only one limitation, computing system 102 may not include sufficient resources for concurrently executing the much larger set of snapshot instances. In other words, the divide and conquer approach may allow exploits to be identified and contained in machines with limited resources and/or multiple executing virtual machines.

For example, a virtual machine may include 60 possible sources of abnormal operation. Upon detecting an abnormal operation in the virtual machine, domain manager 118 may spawn a first set of four snapshot instances, each containing 15 limitations that block 15 different potential sources of abnormal operation. After finding the snapshot instance from the first set that does not exhibit the abnormal operation, domain manager 118 may spawn a second set of five snapshot instances, each containing three of the 15 limitations used in the snapshot instance. Domain manager 118 may then spawn a third set of three snapshot instances using the snapshot instance in the second set that does not exhibit the abnormal operation. Each snapshot instance in the third set may contain only one of the three limitations found in the snapshot instance from the second set. As a result, the specific source of abnormal operation may be found in the snapshot instance from the third set that does not exhibit the abnormal operation.

Consequently, snapshot instances may be used by introspection module 120 as tools for determining the source of the abnormal operation in the virtual machine. Snapshot instances may also be used by domain manager 118 in damage containment mechanisms that respond to the exploit causing the abnormal operation. More specifically, domain manager 118 may use the snapshot instance that does not exhibit the abnormal operation to respond to the attack by updating a state of the virtual machine using the snapshot instance. To update the state of the virtual machine using the snapshot instance, domain manager 118 may accelerate the execution of the snapshot instance to reach a current state of the virtual machine and then replace the virtual machine with the snapshot instance.

To reach the current state of the virtual machine, domain manager 118 may execute the snapshot instance at an accelerated rate using cached incoming events to the virtual machine. As described above, incoming events to the virtual machine may be cached during execution of the virtual machine. The incoming events may continue to be cached after the abnormal operation is detected in the virtual machine. The accelerated execution of the snapshot instance using the cached incoming events may allow the snapshot instance to reach the current state of the virtual machine by processing the remaining cached incoming events. The snapshot instance may then take over the execution of the virtual machine by processing real-time incoming events to the virtual machine. In addition, the snapshot instance may avoid a recurrence of the exploit by continuing to block incoming events from the source of the abnormal operation after replacing the virtual machine.

Figure 2:
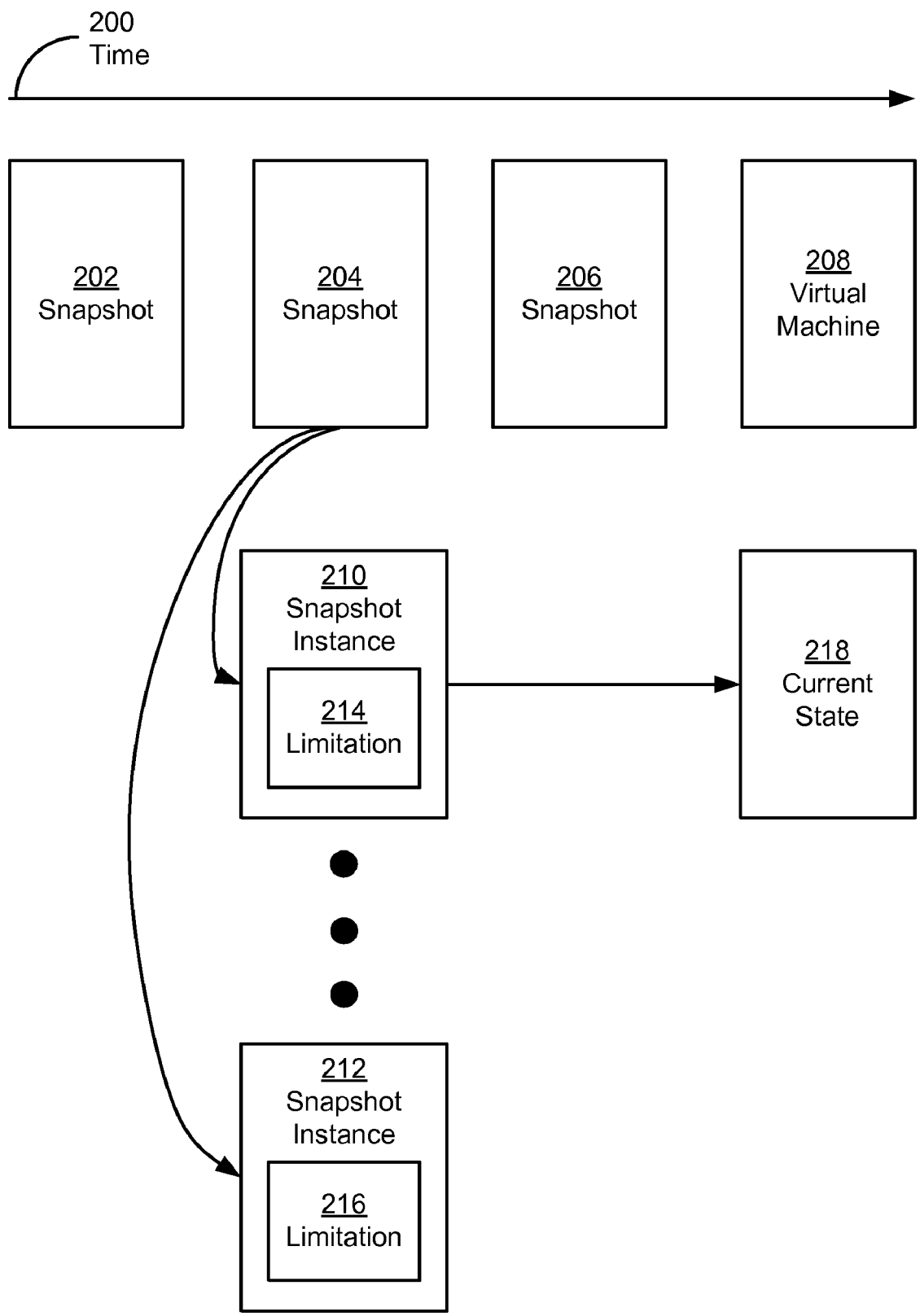
FIG. 2 shows the managed execution of a virtual machine in accordance with an embodiment.

FIG. 2 shows the managed execution of a virtual machine 208 (e.g., guest domains 114-116 of FIG. 1.) in accordance with an embodiment. As shown in FIG. 2, a series of snapshots 202-206 of virtual machine 208 are periodically taken as virtual machine 208 is executed over time 200. As described above, the execution of virtual machine 208 may also be monitored for abnormal operation, and incoming events to virtual machine 208 may be cached. Virtual machine 116 may continue executing until abnormal operation is detected.

Once the abnormal operation is detected, analysis of the abnormal operation may be facilitated by selecting a snapshot 204 taken prior to the detection of the abnormal operation and spawning a set of snapshot instances 210-212 from snapshot 204. Snapshot 204 may be selected based on heuristics associated with the abnormal operation. For example, snapshot 204 may be selected based on the typical detection time of an exploit that may cause the type of abnormal operation observed in virtual machine 208. Alternatively, snapshot 204 may be selected using a much simpler heuristic, such as the second most recent snapshot of virtual machine 208.

Each snapshot instance 210-212 includes a different limitation 214-216 that blocks a potential source of the abnormal operation. For example, limitations 214-216 may block different ports, addresses, user input, and/or remote shells on snapshot instances 210-212. Each limitation 214-216 may additionally be based on a rule or heuristic. For example, limitation 214 may block an Internet Protocol (IP) address on snapshot instance 210 because the IP address may frequently be identified as a source of exploits.

During execution of each snapshot instance 210-212, cached incoming events to the virtual machine are sent to the snapshot instance for processing. Cached incoming events may include network traffic, hardware events, input/output (I/O) events, and/or timing information (e.g., timestamps) for the incoming events. Snapshot instances 210-212 may additionally be executed at an accelerated rate to promptly resolve the source of the abnormal operation. Because the cached incoming events may contain an incoming event that triggers the abnormal operation, the source of the abnormal operation may be determined from the snapshot instance (e.g., snapshot instance 210) that does not exhibit the abnormal operation after processing the cached incoming events. Alternatively, if all snapshot instances 210-212 exhibit the abnormal operation, earlier snapshots (e.g., snapshot 202) may be selected and used to spawn snapshot instances until the source of the abnormal operation is determined from a snapshot instance.

As described above, each snapshot instance 210-212 may include a set of limitations rather than a single limitation. The use of multiple limitations in each snapshot instance 210-212 may allow fewer snapshot instances to run concurrently on limited machine resources. Furthermore, the use of a divide and conquer approach, as described above with respect to FIG. 1, may enable efficient identification of the source of the abnormal operation despite the concurrent execution of fewer snapshot instances than the number of potential sources of abnormal operation in virtual machine 208. For example, the source of the abnormal operation in virtual machine 208 may be determined from 125 potential sources by executing three sets of five snapshot instances sequentially, with the number of limitations in each subsequent set reduced by a factor of five from that of the previous set and/or virtual machine 208.

Snapshot instance 210 may then be used to update the state of the virtual machine. In particular, the accelerated execution of snapshot instance 210 may continue until snapshot instance 210 reaches a current state 218 of virtual machine 116. Upon reaching current state 218, snapshot instance 210 may have processed all cached incoming events except those blocked by limitation 214. Snapshot instance 210 may then replace virtual machine 208 and process real-time incoming events in lieu of virtual machine 208.

Figure 3:
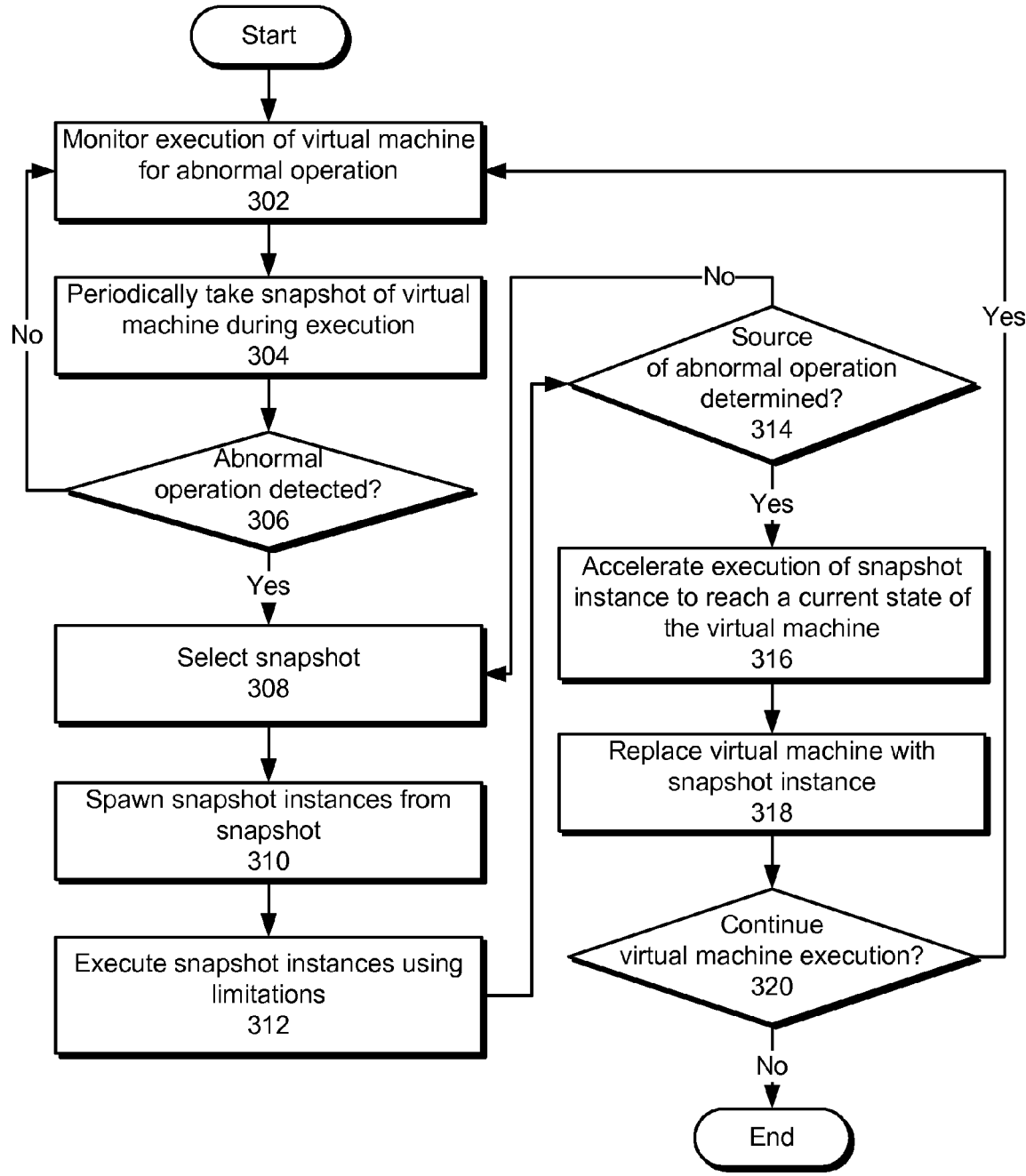
FIG. 3 shows a flowchart illustrating the process of managing the execution of a virtual machine in accordance with an embodiment.

FIG. 3 shows a flowchart illustrating the process of managing the execution of a virtual machine in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

Initially, the execution of the virtual machine is monitored for abnormal operation (operation 302). Abnormal operation may correspond to operation outside the expected behavior of the virtual machine. Monitoring the virtual machine may further involve caching incoming events to the virtual machine. In addition, a snapshot of the virtual machine is periodically taken during execution of the virtual machine (operation 304).

An abnormal operation of the virtual machine may also be detected (operation 306). The abnormal operation may indicate a potential exploit of the virtual machine. If no abnormal operation is detected, the virtual machine may continue to be monitored and snapshotted during execution (operations 302-304). However, if an abnormal operation is detected, a snapshot of the virtual machine is selected (operation 308) and a set of snapshot instances is spawned from the snapshot (operation 310). Furthermore, the snapshot instances are executed using different limitations (operation 312) that may block potential sources of the abnormal operation, such as ports or addresses. As a result, each snapshot instance may execute by processing the cached incoming events to the virtual machine except the incoming events blocked by the limitation imposed on the snapshot instance.

The source of the abnormal operation may be determined (operation 314) from the snapshot instance that does not exhibit the abnormal behavior. However, if all snapshot instances exhibit the abnormal behavior, an earlier snapshot is selected (operation 308), snapshot instances are spawned from the earlier snapshot (operation 310), and the snapshot instances are executed using a set of limitations (operation 312) until the source of abnormal operation is determined from a snapshot that does not contain the exploit.

Once the source of abnormal operation is determined, the execution of the snapshot instance that does not exhibit the abnormal operation is accelerated to reach a current state of the virtual machine (operation 316). In particular, the snapshot instance may continue to process cached incoming events to the virtual machine at an accelerated rate until the snapshot instance has processed all cached incoming events and can process real-time incoming events sent to the virtual machine. The virtual machine may then be replaced with the snapshot instance (operation 318).

The execution of the new virtual machine (e.g., the snapshot instance) may continue (operation 320) by monitoring the execution of the virtual machine and periodically taking snapshots of the virtual machine (operations 302-304) until an abnormal operation is detected (operation 306). The abnormal operation may then be analyzed through the execution of snapshot instances from a selected snapshot of the virtual machine (operations 308-312) and determining the source of the abnormal operation based on limitations of the snapshot instances (operation 314). Finally, the abnormal operation may be fixed by replacing the virtual machine with a snapshot instance that does not exhibit the abnormal operation (operations 316-318). Exploits in the virtual machine may thus be detected, analyzed, and managed using snapshot instances and limitations until the virtual machine is no longer executed.

The foregoing descriptions of various embodiments have been presented only for purposes of illustration and description. They are not intended to be exhaustive or to limit the present embodiments to the forms disclosed. Accordingly, many modifications and variations will be apparent to practitioners skilled in the art. Additionally, the above disclosure is not intended to limit the present embodiments.

What is claimed is:

1. A computer-implemented method for managing the execution of a virtual machine, comprising:
   taking a series of snapshots of the virtual machine during execution of the virtual machine, wherein each snapshot captures a state of the virtual machine at a corresponding time;
   if an abnormal operation of the virtual machine is detected:
      spawning a set of snapshot instances from one of the series of snapshots, wherein spawning the set of snapshot instances comprises, for each snapshot instance in the set of snapshot instances, concurrently executing the snapshot instance using a different set of limitations, wherein each limitation in the set blocks a different potential source of the abnormal operation so that the snapshot using the limitation does not process incoming events from the potential source;
      determining a source of the abnormal operation using a snapshot instance from the snapshot instances that does not exhibit the abnormal operation; and
      updating a state of the virtual machine using the snapshot instance.

2. The computer-implemented method of claim 1, wherein updating the state of the virtual machine using the snapshot instance involves:
   accelerating the execution of the snapshot instance to reach a current state of the virtual machine; and
   replacing the virtual machine with the snapshot instance.

3. The computer-implemented method of claim 2, wherein accelerating the execution of the snapshot instance involves:
   caching incoming events associated with the virtual machine; and
   executing the snapshot instance at an accelerated rate using the cached incoming events.

4. The computer-implemented method of claim 1, further comprising:
   selecting a snapshot from the series of snapshots to execute as the set of snapshot instances; and
   if the source of the abnormal operation cannot be determined from the snapshot, selecting an earlier snapshot from the series of snapshots to execute as the set of snapshot instances.

5. The computer-implemented method of claim 1, wherein the snapshots are taken at periodic intervals during execution of the virtual machine.

6. The computer-implemented method of claim 1, wherein the potential source of the abnormal operation corresponds to at least one of a port and an address.

7. The method of claim 1, wherein a limitation corresponds to at least one of a port, address, disk input, keyboard input, and a remote shell.

8. The method of claim 1, wherein a limitation corresponds to at least one of a disk input, keyboard input, and a remote shell.

9. The method of claim 1, wherein a given set of the limitations corresponds to a port, address, disk input, keyboard input, and a remote shell.

10. A system for managing the execution of a virtual machine, comprising:
    a computing system that performs operations for:
       an introspection module configured to monitor an execution of the virtual machine for abnormal operation; and
       a domain manager configured to take a series of snapshots of the virtual machine during the execution of the virtual machine, wherein each snapshot captures a state of the virtual machine at a corresponding time,
       wherein if an abnormal operation of the virtual machine is detected:
          the domain manager is further configured to spawn a set of snapshot instances from one of the series of snapshots, wherein spawning the set of snapshot instances comprises, for each snapshot instance in the set of snapshot instances, concurrently executing the snapshot instance using a different set of limitations, wherein each limitation in the set blocks a different potential source of the abnormal operation so that the snapshot using the limitation does not process incoming events from the potential source; and
          the introspection module is further configured to determine a source of the abnormal operation using a snapshot instance from the snapshot instances that does not exhibit the abnormal operation.

11. The system of claim 10, wherein the domain manager is further configured to update a state of the virtual machine using the snapshot instance.

12. The system of claim 11, wherein updating the state of the virtual machine using the snapshot instance involves:
    accelerating the execution of the snapshot instance to reach a current state of the virtual machine; and
    replacing the virtual machine with the snapshot instance.

13. The system of claim 12, wherein accelerating the execution of the snapshot instance involves:

caching incoming events associated with the virtual machine; and executing the snapshot instance at an accelerated rate using the cached incoming events.

14. The system of claim 10, wherein the domain manager is further configured to:

select a snapshot from the series of snapshots to execute as the set of snapshot instances; and if the source of the abnormal operation cannot be determined from the snapshot, select an earlier snapshot from the series of snapshots to execute as the set of snapshot instances.

15. The system of claim 10, wherein the snapshots are taken at periodic intervals during execution of the virtual machine.

16. The system of claim 10, wherein the potential source of the abnormal operation corresponds to at least one of a port and an address.

17. A non-transitory computer-readable storage medium storing instructions that when executed by a computer cause the computer to perform a method for managing the execution of a virtual machine, the method comprising:

taking a series of snapshots of the virtual machine during execution of the virtual machine, wherein each snapshot captures a state of the virtual machine at a corresponding time;

if an abnormal operation of the virtual machine is detected:

spawning a set of snapshot instances from one of the series of snapshots, wherein spawning the set of snapshot instances comprises, for each snapshot instance in the set of snapshot instances, concurrently executing the snapshot instance using a different set of limitations, wherein each limitation in the set blocks a different potential source of the abnormal operation so that the snapshot using the limitation does not process incoming events from the potential source;

determining a source of the abnormal operation using a snapshot instance from the snapshot instances that does not exhibit the abnormal operation; and updating a state of the virtual machine using the snapshot instance.

18. The computer-readable storage medium of claim 17, wherein updating the state of the virtual machine using the snapshot instance involves:

accelerating the execution of the snapshot instance to reach a current state of the virtual machine; and replacing the virtual machine with the snapshot instance.

19. The computer-readable storage medium of claim 18, wherein accelerating the execution of the snapshot instance involves:

caching incoming events associated with the virtual machine; and executing the snapshot instance at an accelerated rate using the cached incoming events.

20. The computer-readable storage medium of claim 17, the method further comprising:

selecting a snapshot from the series of snapshots to execute as the set of snapshot instances; and if the source of the abnormal operation cannot be determined from the snapshot, selecting an earlier snapshot from the series of snapshots to execute as the set of snapshot instances.

\* \* \* \* \*